United States Patent [19]

Drs et al.

[11] Patent Number: 5,753,037
[45] Date of Patent: May 19, 1998

[54] FLUIDITY CONTROL OF CEMENTITIOUS COMPOSITIONS

[75] Inventors: Josef Franz Drs, Vienna, Austria; Max Oppliger, Allschwil; Salvatore Valenti, Binningen, both of Switzerland

[73] Assignee: MBT Holding AG, Zurich, Switzerland

[21] Appl. No.: 732,481

[22] PCT Filed: Apr. 12, 1995

[86] PCT No.: PCT/EP95/01360

§ 371 Date: Oct. 10, 1996

§ 102(e) Date: Oct. 10, 1996

[87] PCT Pub. No.: WO95/28362

PCT Pub. Date: Oct. 26, 1995

[30] Foreign Application Priority Data

Apr. 13, 1994 [GB] United Kingdom ............... 9407246

[51] Int. Cl.$^6$ ........................................... C09D 7/12
[52] U.S. Cl. .................. 106/823; 106/724; 106/728; 106/802
[58] Field of Search ................. 106/696, 724, 106/728, 802, 819, 823, 810; 524/5

[56] References Cited

U.S. PATENT DOCUMENTS

| | | | |
|---|---|---|---|
| 4,002,713 | 1/1977 | Duncan et al. | 264/234 |
| 4,229,224 | 10/1980 | Dawson et al. | 106/90 |
| 4,507,154 | 3/1985 | Bürge et al. | 106/315 |
| 4,814,014 | 3/1989 | Arfaei | 106/727 |
| 4,960,465 | 10/1990 | Arfaei | 106/724 |
| 5,336,316 | 8/1994 | Dawson et al. | 106/724 |
| 5,556,460 | 9/1996 | Berke et al. | 106/802 |
| 5,603,758 | 2/1997 | Schreifels, Jr. et al. | 106/738 |

FOREIGN PATENT DOCUMENTS

| | | |
|---|---|---|
| 0076927 | 4/1983 | European Pat. Off. . |
| 0273711 | 7/1988 | European Pat. Off. . |
| 0408099 | 1/1991 | European Pat. Off. . |
| 0430576 | 6/1991 | European Pat. Off. . |
| 402212408 | 8/1990 | Japan . |
| 403130207 | 6/1991 | Japan . |
| 403130209 | 6/1991 | Japan . |
| 403130210 | 6/1991 | Japan . |
| 404221304 | 8/1992 | Japan . |
| 1388349 | 3/1975 | United Kingdom . |
| 2187727 | 9/1987 | United Kingdom . |
| 2240334 | 7/1991 | United Kingdom . |

OTHER PUBLICATIONS

Derwent Abstract of JP 57038357—*Cement-improving agent of synthetic rubber latex prepared from conjugated di:olefin, alpha, beta-ethylene unsaturated carboxylic acid and vinyl monomer with protective colloid layer*, Mar. 1982, Takeda Chemical Ind. KK.

Abstract of JP 59035053—*Polyethylene polyvinyl acetate calcium sulphate*, Feb. 1984, Kenki Kagaku Kogyo KK.

Derwent Abstract of DD 134760—*Cement mortar containing carboxylated polydiene copolymer latex useful as plaster and joint composition with good workability and adhesive*, Mar. 1979, Chem Werk Buna Veb.

Chemical Abstract: vol. 105:47912a—*Study of the effect of a complex chemical additive and heat insulation on hardening of concrete*, Grankovskii, et al., 1986.

*Primary Examiner*—Paul Marcantoni
*Attorney, Agent, or Firm*—Fish & Richardson P.C.

[57] ABSTRACT

The fluidity characteristics of cementitious compositions may be rapidly altered by the addition thereto of an aqueous dispersion of at least one comb polymer which comprises carboxylic moieties. The invention works especially well when the polymer is combined with an accelerator which is at least one of aluminium hydroxide or aluminium hydroxysulphate.

12 Claims, No Drawings

FLUIDITY CONTROL OF CEMENTITIOUS COMPOSITIONS

This invention relates to cementitious compositions and more particularly to cementitious compositions with predetermined fluidity characteristics.

Cementitious mixes are required to be fluid or workable for at least part of their lives. This allows them to be placed easily prior to their "set-up" (becoming rigid) and subsequently hardening (sometimes called "setting") (the formation of a hard material by a complex series of hydration reactions). The fluidity or workability of cementitious compositions such as concretes or mortars may be measured, for example, by the slump test, defined in ASTM C143.

Achieving sufficient fluidity for a sufficiently long period can prove difficult under some conditions, and it can happen that a cementitious composition loses fluidity too quickly and sets up before the composition is in place, with unfortunate consequences. The art-recognized plasticizers and superplasticizers cannot rectify this problem.

In copending patent application PCT/EP 93/01910, it has been suggested that the use of a two-component system can produce considerable improvements. In such a system, a polyalkylene oxide and a selected plasticizer or superplasticizer are added to the cementitious composition at mixing and a β-naphthalene sulphonate condensate ("BNS") is added just before application. The polyalkylene oxide and (super)plasticizer give increased fluidity (allowing, for example, the composition to be pumped easily or to flow to an adequate extent around complicated formwork) and the BNS abruptly reduces the fluidity (causing a sudden loss of flow and setting up). The composition can then set conventionally, or, in special cases such as application by spraying (such as "shotcreting"), setting or hardening is augmented by known accelerators.

It has now been found that the fluidity of cementitious compositions may be varied by the use therein of certain materials. There is therefore provided, according to the present invention, a process of rapidly altering the fluidity of a fluid cementitious composition, comprising the addition thereto of an aqueous dispersion of at least one comb polymer which comprises pendant carboxylic moieties.

By "comb" polymer is meant a branched polymer which comprises a backbone polymer from which depend a number of branches. The term is well known in the art (as, for example, "Polymer Science Dictionary" by M. S. M. Alger (Elsevier, 1989)). In the comb polymer useful in the present invention, the branches pendant from the backbone (whose chemical nature is largely irrelevant) are carboxyl group-bearing moieties. These moieties may be up to 100 units long and may comprise monomer residues of, for example, (meth)acrylic acid, maleic acid or fumaric acid. It should be noted that polymerised unsaturated acids such as poly(meth)acrylic acid are not comb polymers.

A preferred backbone is a random addition copolymer in which one of the monomers from which the copolymer was prepared comprised more than one, and preferably two, polymerizable double bonds. The backbone also preferably comprises styrene. For the polymers of this invention, "styrene" includes styrene itself and substituted styrenes such as α-methyl styrene, ethyl styrene, dimethyl styrene and the mixed isomers commercially available as "vinyl toluene". It is possible to use styrenes with more than one polymerisable double bond, for example, divinyl benzene, but such monomers should comprise no more than 5% by weight of the styrene. The preferred monomer is styrene, but other styrenes may also be used in combination.

The monomer with more than one double bond may be selected from such monomers as isoprene, butadiene, chloroprene and the various diallyl monomers such as diallyl phthalate and diallyl adipate. The preferred monomer is butadiene, but, again, more than one such monomer may be used.

A preferred copolymer is a styrene-butadiene copolymer. To such a copolymer (which may have pendant and/or in-chain polymerizable double bonds) carboxyl group-containing monomers such as acrylic acid, methacrylic acid, maleic acid or fumaric acid may be graft copolymerized. Examples of preferred copolymers are styrene-butadiene copolymerized with acrylic acid and styrene/butadiene/maleic (or fumaric) acid terpolymer.

The polymers of this invention have molecular weights in excess of 20,000 and are solids at room temperature. They also have a limited solubility in water, being at best dispersible (never completely soluble), but they are highly soluble in alkaline media (such as a fluid cementitious mix). In the case of poly(meth)acrylic acid and polymers which are inherently soluble in water, it is possible to prepare such polymers in such a form that the necessary solubility is achieved, for example, particulate form. They are added to the cementitious mix as an aqueous dispersion of less than 5% solids by weight.

Typical examples of suitable commercial materials are those available under the trade mark "Synthomer" (ex Synthomer Chemie GmbH, Frankfurt/Main, Germany). An especially suitable example is "Synthomer" 9523 (a methacrylic acid-styrene-butadiene copolymer). Another suitable commercial product is "Polyacryl" AD (ex Polygon Chemie AG, Olten, Switzerland)

The aqueous dispersion may be used in any cementitious composition where it is practical to add the dispersion immediately prior to the time when fluidity change is required. One case in particular is in the spraying of a cementitious composition on to a substrate. In this case, the aqueous polymer dispersion is added at the spray nozzle through which the composition is sprayed. It is important to note that, in the case of spraying cementitious compositions where rapid strength development is desired, it is essential to use an accelerator. Shotcrete accelerators are well known to the art and are described in, for example, "Concrete Admixtures Handbook" (V. S. Ramachandran, Ed., Noyes 1984) at p.547. Typical examples are silicates (especially water glass) and alkali aluminates.

However, in a surprising and especially valuable aspect of the invention, it has been found that a combination of an acrylic polymer dispersion such as the type hereinabove defined and a particular chemical compound can give outstanding performance in sprayed cementitious compositions. The invention therefore provides a process of rapidly altering the fluidity of a fluid cementitious composition, comprising the addition thereto of an aqueous dispersion of at least one polymer which comprises pendant carboxylic moieties and an accelerator selected from at least one of aluminium hydroxide and aluminium hydroxysulphate. The invention also provides an admixture for sprayed cementitious compositions, consisting of water, polymer as hereinabove defined and an accelerator selected from at least one of aluminium hydroxide and aluminium hydroxysulphate. The invention further provides a method of forming a layer of cementitious composition on a substrate by spraying, wherein there is added to the composition immediately prior to spraying an admixture as hereinabove defined.

In this aspect of the invention, it is possible to use in the aqueous dispersion any polymer which comprises pendant carboxylic moieties. Examples are addition polymers which comprise monomer units derived from such carboxylic acid monomers as (meth)acrylic acid and maleic and fumaric acids. Acrylic polymers are preferred, more preferably poly (meth)acrylic acid. However, the most preferred polymers are the comb polymers hereinabove defined.

This aspect of the invention confers considerable advantages. It is found that the composition can be applied in thick layers which set in a very short time, thus reducing considerably sagging and dropping. Moreover, it is found that rebound (the tendency for at least a portion of a sprayed cementitious composition to bounce off a substrate on impact) is much reduced and in some cases is virtually absent.

A further advantage lies in the fact that the aluminium compounds are non-alkaline and are much less hazardous in use.

The use of aluminium hydroxide as an alkali-free accelerator in shotcrete has been suggested in the art. European Patent 0076927 describes a mixture of aluminium hydroxide and aluminium sulphate. However, it has been found that aluminium hydroxysulphate performs particularly well and is therefore the preferred accelerator. It may be mixed with aluminium hydroxide and/or sulphate, but it is preferred to use it alone. A preferred material is commercially available as "Gecedral" L (ex Giulini Chemie GmbH, Ludwigshafen/ Rhein, Germany). The relative quantities of the three components may be varied as follows:

| | |
|---|---|
| aluminium hydroxide/hydroxysulphate | 15–25 parts by weight |
| polymer (solids) | 5–10 parts by weight |
| water | 80–65 parts by weight |

In a preferred admixture, aluminium hydroxysulphate, polymer and water are used in the respective weight proportions of 20, 8 and 72 parts.

The admixture is prepared by blending the accelerator into the aqueous polymer dispersion and adding water if necessary. It may be injected into a spray nozzle.

In a further embodiment of this invention, the performance of sprayed cementitious compositions may be further enhanced by the addition to the cementitious composition prior to spraying of at least one chemical compound which forms a chelate with calcium.

The use of such compounds in spraying cementitious compositions is known from co-pending British Patent Application 2,240,334 (the contents whereof are incorporated herein by reference). In this disclosure, the usual accelerators for shotcrete are named as being suitable for use. However, the combination of the calcium chelating agents of this invention with an admixture as hereinabove described gives results which are superior to those obtained by the use of the admixture alone.

The calcium chelating agents for use in this invention may be any such agents, but the preferred agents are phosphonic acid derivatives more particularly those which comprise carboxy, hydroxy or amino groups. An example of the carboxy group-containing class is "Bayhibit" (trade mark) (ex Bayer AG, Leverkusen, Germany).

Examples of the hydroxy or amino group-containing material are the cornmercially-available "Dequest" (trade mark) material (ex Monsanto Co. St. Louis, U.S.A.). A list of "Dequest" materials suitable for use in the working of this invention is given below.

"Dequest" 2000: aminotri(methylenephosphonic acid)
"Dequest" 2006: aminotri(methylenephosphonic acid)-pentasodium salt
"Dequest" 2010: 1-hydroxyethylidene-1,1-diphosphonic acid
"Dequest" 2016: 1-hydroxyethylidene-1,1-diphosphonic acid-tetrasodium salt
"Dequest" 2041: ethylenediaminetetra (methylenephosphonic acid)
"Dequest" 2047: ethylenediaminetetra (methylenephosphonic acid)-calcium/sodium salt
"Dequest" 2051: hexamethylenediaminetetra (methylenephosphonic acid)
"Dequest" 2054: hexamethylenediaminetetra (methylenephosphonic acid)potassium salt
"Dequest" 2060: diethylenetriaminepenta (methylenephosphonic acid)
"Dequest" 2066: diethylenetriaminepenta (methylenephosphonic acid)-sodium salt.

It is permissible to use two or more of these materials.

Other materials which perform this chelating function and which are useful in the working of this invention include:

hydroxycarboxylic acids and their salts, for example, salicylic, citric, lactic, gluconic, tartaric, mucic and glucoheptanoic acids;

polycarboxylic acids and their salts, including polymeric acids, for example, maleic, fumaric, itaconic, succinic, malonic and phthalic acids and polyacrylic, polymethacrylic and polyfumaric acids, the polymerized acids preferably being of low molecular weight;

antioxidants, for example, ascorbic and isoascorbic acids;

polymers, for example, acrylic acid copolymers containing sulphonic acid groups and polyhydroxysilanes, these polymers preferably having a low molecular weight;

aldoses and ketoses, for example, sugar and corn syrup and lignosulphates, for example, calcium lignosulphonate;

inorganic complexing agents, for example, phosphates and borates;

organic complexing agents, for example, EDTA (ethylenediaminetetraacetic acid) and NTA (nitrilotriacetic acid); and zeolites.

Again, it is permissible to use blends of two or more of these materials. The preferred materials of this type are hydroxycarboxylic acids, polycarboxylic acids, phosphates and mixtures thereof.

Preferred materials are mixtures of at least one phosphonic acid derivative and at least one other calcium-chelating compound. Since many of these calcium-chelating compounds which do not belong to the group of phosphonic acid derivatives also have water-reducing properties, these also increase the compressive strength of the hardened concrete. A typical combination is a phosphonic acid derivative with gluconic acid or a salt thereof.

Especially preferred materials are mixtures of one of the previously-listed phosphonic acid derivatives with citric acid and salts thereof, in particular aminotri (methylenephosphonic acid) and citric acid or a salt thereof. Preferred ratios of the above-mentioned phosphonic acid derivatives to citric acid are from 1:1 to 2:1.

The principles of use of these calcium chelating agents are to be found in GB 2,240,334 and reference should be made to this document in relation to the quantity of calcium-complexing compound to be used in any particular set of circumstances, but as a general rule, the compounds are used at a rate of from 0.1–5.0%, preferably from 0.4–02% by weight of cement+any mineral admixtures present (for a complete guide to mineral admixtures, see Ramachandran optic, p.303).

When a calcium chelating agent is used according to this invention, it is blended into the initial mix prior to pumping.

The compositions and processes of this invention are useful in the spraying of cementitious composition by both the "wet" and "dry" methods, but they work better in the "wet" method where water is added at the mixing stage prior to pumping. The aspect of the invention in which the calcium complexing agent is used is particularly suited to the "wet" method.

Sprayable cementitious compositions which utilize this invention form thick layers which "set up" quickly and can be resprayed without any problems. Rebound characteristics are particularly good, as are both strength development and long term strength.

The invention is further described with reference to the following examples in which all parts are expressed by weight.

EXAMPLE

A spraying concrete mix is made up as follows:

| | |
|---|---|
| Portland cement[1] | 450 parts |
| Sand 1 mm max. | 600 parts |
| Aggregate 8 mm max. | 1200 parts |
| densified microsilica[2] | 40 parts |

[1] ex Perlmoser Zementwerk, Austria
[2] ex ELKEM A/S, Norway

Water is added to give a W/C (water to cement ratio) of 0.50. To this is added 0.8% by weight of the weight of cement of a styrene superplasticizer ("Rheobuild" (trade mark) 3520 (ex MBT, Zurich Switzerland) is used).

To portions of this mix were added various quantities of a blend of water, "Gecedral" L aluminium hydroxysulphate and "Synthomer" 9523 acrylic dispersion in the weight percentages of 72:20:8 respectively. The quantities used were as follows:

Portion 1: 3.0% by weight of cement
Portion 2: 5.88% by weight of cement
Portion 3: 10.0% by weight of cement
Portion 4: 5.0% by weight of cement These portions are all injected at the spraying nozzle when the mix is sprayed. In addition, there is incorporated in Portion 4 at the mixing stage 0.3% by weight on solids of "Delvo" trade mark) stabilizer (ex MBT, Zürich, Switzerland)

It is found in all cases that it is possible to spray thick layers with no dropping or sagging and nearly no rebound. The rapid "set up" allows a substrate to be sprayed again within 2–3 minutes and substantial layers can therefore be built up quickly. The strength of the concrete as measured by penetrometer is as follows:

| Age of shotcrete minutes | Portion 1 N/mm² | Portion 2 N/mm² | Portion 3 N/mm² | Portion 4 N/mm² |
|---|---|---|---|---|
| 5 | | | | 0.25 |
| 6 | 0.18 | | | |
| 7 | | | 0.25 | |
| 8 | | 0.31 | | |
| 10 | 0.31 | 0.39 | | 0.39 |
| 12 | | | 0.25 | |
| 15 | | 0.47 | | 0.60 |
| 20 | 0.39 | | 0.31 | 0.68 |
| 25 | | | 0.39 | 0.68 |
| 30 | | | 0.39 | |
| 35 | 0.52 | | 0.93 | 0.80 |

We claim:

1. A process of rapidly altering the fluidity of a fluid cementitious composition, comprising adding thereto an aqueous dispersion of at least one comb polymer which comprises pendant carboxylic moieties.

2. A process according to claim 1, wherein the comb polymer is a random addition copolymer, in which one of the monomers from which the copolymer was prepared included at least one polymerizable double bonds.

3. A process according to claim 1 or claim 2, wherein the monomer comprising more than one double bond is butadiene.

4. A process according to any one of claims 1–3, wherein the said comb polymer comprises styrene.

5. A process according to any one of claims 1–4, wherein the comb polymer is a graft copolymer having a backbone of styrene and butadiene and side chains comprising monomer units derived from monomer selected from the group consisting of: acrylic acid, methacrylic acid, maleic acid and fumaric acid.

6. A process of rapidly altering the fluidity of a fluid cementitious composition, comprising the addition thereto of an aqueous dispersion which includes at least one comb polymer which comprises pendant carboxylic moieties and at least one accelerator selected from aluminium hydroxide and aluminium hydroxysulphate.

7. A process according to claim 6, wherein the at least one comb polymer is selected from copolymers which comprise acrylic and methacrylic acid residues and comb polymers comprising pendant carboxylic moieties.

8. A process for rapidly altering the fluidity of a fluid cementitious composition, comprising the process of:

adding to the fluid cementitious composition an aqueous dispersion of at least one comb polymer which comprises a polymer backbone and which further comprises pendant carboxylic moieties.

9. A process according to claim 8 wherein the at least one comb polymer has a polymer backbone which is a styrene/butadiene copolymer.

10. A process according to claim 9 wherein comb polymer includes as the further pendant carboxylic moieties, side chains of the comb polymer which comprise monomer units derived from at least one monomer selected from the group consisting of: acrylic acid, methacrylic acid, maleic acid and fumaric acid.

11. A process according to claim 8 wherein the at least one comb polymer is a styrene/butadiene/maleic acid terpolymer.

12. A process according to claim 8 wherein the aqueous dispersion further comprises aluminium hydroxide or aluminium hydroxysulphate.

* * * * *